(12) United States Patent
Hsieh

(10) Patent No.: US 7,513,013 B2
(45) Date of Patent: Apr. 7, 2009

(54) HINGE

(75) Inventor: Ching-Ho Hsieh, Shulin (TW)

(73) Assignee: Shin Zu Shing Co., Ltd., Shulin, Taipei Hsien (TW)

( * ) Notice: Subject to any disclaimer, the term of this patent is extended or adjusted under 35 U.S.C. 154(b) by 449 days.

(21) Appl. No.: 11/459,472

(22) Filed: Jul. 24, 2006

(65) Prior Publication Data

US 2008/0034545 A1  Feb. 14, 2008

(51) Int. Cl.
*E05D 3/10* (2006.01)
(52) U.S. Cl. ........................................................ 16/367
(58) Field of Classification Search ........... 16/337–339,
16/342, 330, 303, 374, 376, 377, 340, 367;
361/680–683, 814; 455/90.3, 575.1, 575.3,
455/575.8; 379/433.12, 433.13; 348/373,
348/333.01, 333.06, 794
See application file for complete search history.

(56) References Cited

U.S. PATENT DOCUMENTS

| | | | |
|---|---|---|---|
| 6,742,221 B2 * | 6/2004 | Lu et al. ........................ | 16/367 |
| 6,798,646 B2 * | 9/2004 | Hsu ............................. | 361/681 |
| 6,912,122 B2 * | 6/2005 | Chen et al. ................... | 361/681 |
| 7,096,540 B2 * | 8/2006 | Watanabe et al. ............. | 16/367 |
| 7,189,023 B2 * | 3/2007 | Kang et al. ................... | 403/119 |
| 2004/0107540 A1 * | 6/2004 | Hsu ............................. | 16/366 |
| 2005/0207104 A1 * | 9/2005 | Love ........................... | 361/683 |
| 2005/0251965 A1 * | 11/2005 | Lu et al. ....................... | 16/367 |
| 2006/0282985 A1 * | 12/2006 | Lu et al. ....................... | 16/367 |

* cited by examiner

*Primary Examiner*—Chuck Y. Mah
(74) *Attorney, Agent, or Firm*—patenttm.us

(57) ABSTRACT

A hinge has a mounting bracket, a hinge assembly, a limit and positioning element, a bushing assembly, a supplementary positioning element and an end cap. The mounting bracket has two limits and a mounting hole. The hinge assembly is mounted rotatably through the mounting hole of the mounting bracket and has at least one pintle and at least on leaf mounted pivotally on the pintle. The limit and positioning element is mounted securely around the mounting cylinder and slidably against the mounting bracket and keeps the hinge assembly from over-rotating. The bushing assembly comprises at least one plastic washer, is mounted securely around the mounting cylinder and slidably abuts the mounting hole in the mounting bracket. The supplementary positioning element is mounted around the mounting cylinder and slidably against the mounting bracket. The end cap attaches to the mounting cylinder to hold the hinge assembly on the mounting bracket.

5 Claims, 6 Drawing Sheets

HINGE

BACKGROUND OF THE INVENTION

1. Field of the Invention

The present invention relates to a hinge, and more particularly to a hinge for mounting a monitor in an electronic device.

2. Description of Related Art

Generally, an electronic device a notebook computer, a cellular phone or the like comprises a body, a monitor and a hinge. The hinge connects the monitor pivotally to the body so the monitor is able to open or close relative to the body. To provide additional flexibility, some hinges are further able to rotate horizontally when the monitor has been pivoted from the body.

However, limiting devices are not included in conventional hinges, so monitors connected with conventional hinges often over-rotate and cause cables and wires connecting circuits in the monitors and bodies to twist and tangle. Furthermore, conventional hinges are normally unable to hold the monitors in position relative to the bodies.

Furthermore, most conventional hinges are fabricated from metal such as aluminum or steel to resist wear. Since individual components must be fabricated and assembled, the manufacturing process for conventional hinges is inevitably difficult and time-consuming.

To overcome the shortcomings, the present invention provides a hinge to obviate or mitigate the aforementioned problems.

SUMMARY OF THE INVENTION

The main objective of the present invention is to provide a hinge that is capable of positioning.

Another objective of the present invention is to provide components that made of malleable metal and can be easily bent to make fabrication of the hinge easy and timesaving.

To achieve the objective, the hinge in accordance with the present invention is used with an electronic device having a body and a monitor and comprises a mounting bracket, a hinge assembly, a limit and positioning element, a bushing assembly, a supplementary positioning element and an end cap. The mounting bracket is attached to the body and has a mounting hole. The hinge assembly is made of malleable metal like zinc alloy, has at least one pintle and at least one leaf mounted pivotally on the pintle to connect to the monitor and a mounting cylinder mounted rotatably through the mounting hole in the mounting bracket. The limit and positioning element is mounted securely around the mounting cylinder and slidably against the top of the mounting bracket and keeps the hinge assembly from over-rotating. The bushing assembly comprises at least one plastic washer, is mounted securely around the mounting cylinder and slidably abuts the mounting hole in the mounting bracket to keep the mounting cylinder from wearing due to friction. The supplementary positioning element is mounted around the mounting cylinder and slidably against the bottom of the mounting bracket. The end cap attaches to the mounting cylinder to hold the hinge assembly on the mounting bracket.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
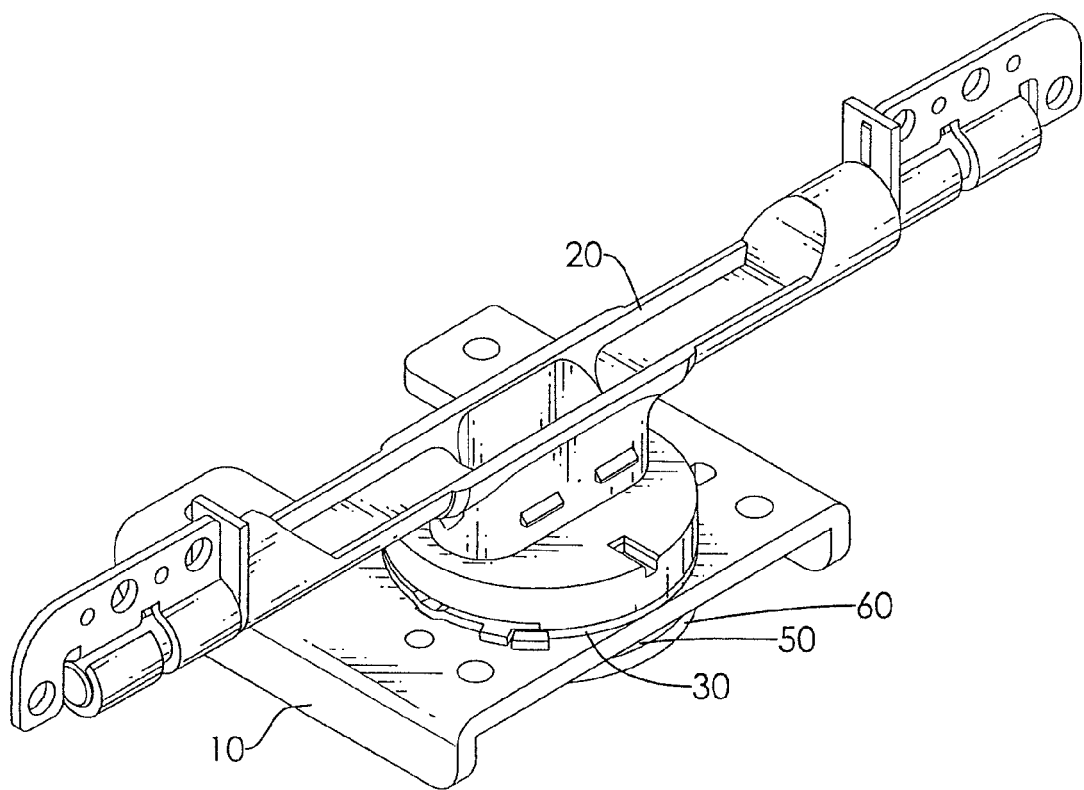
FIG. 1 is a perspective view of a hinge in accordance with the present invention.
Figure 2:
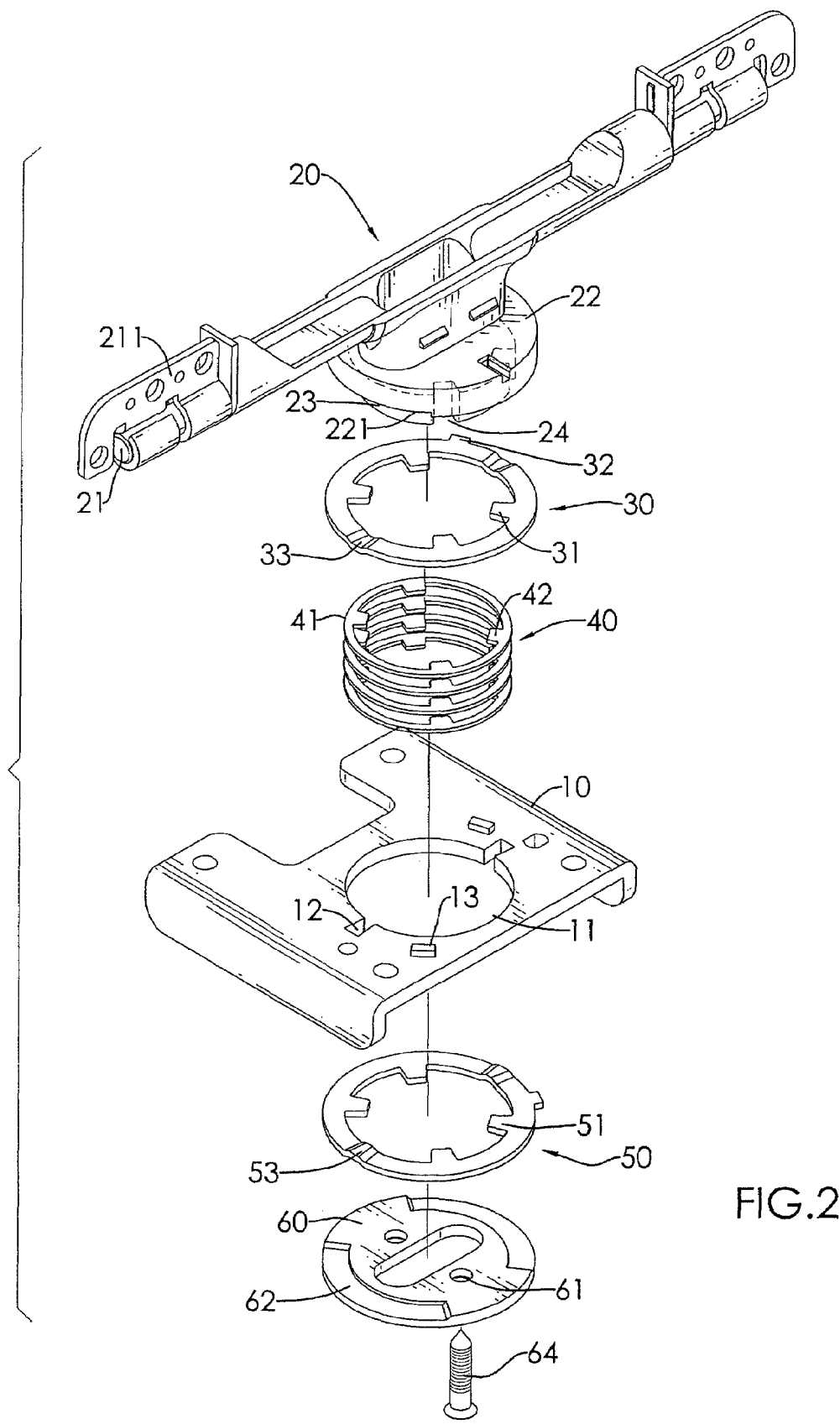
FIG. 2 is an exploded perspective view of the hinge in FIG. 1.
Figure 6:
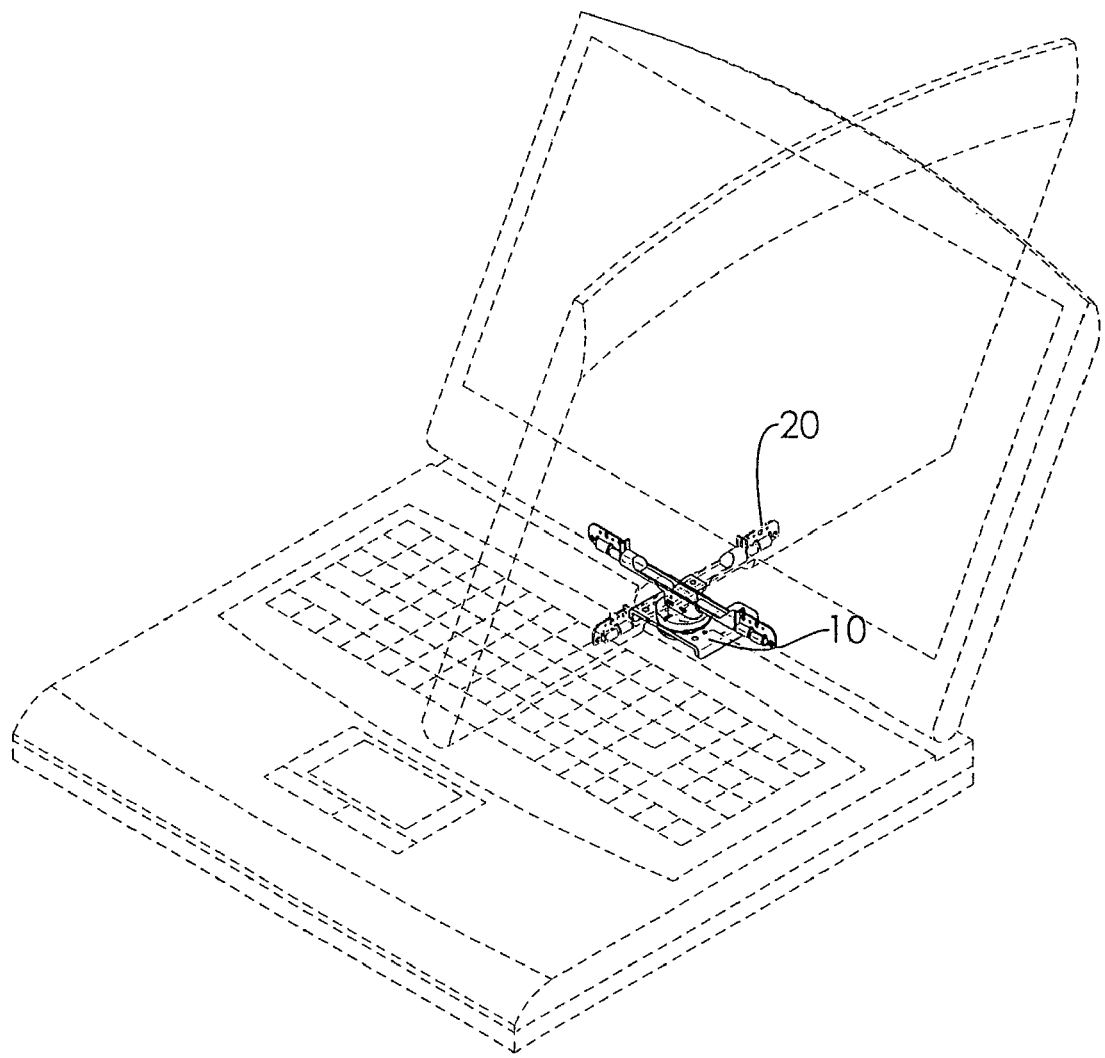
FIG. 6 is an operational perspective view of the hinge in FIG. 1 mounted in a notebook computer.

With reference to FIGS. 1, 2 and 6, the hinge in accordance with the present invention is used in an electronic device having a body and a monitor, pivotally and rotatably connects the monitor to the body and comprises a mounting bracket (10), a hinge assembly (20), a limit and positioning element (30), a bushing assembly (40), a supplementary positioning element (50) and an end cap (60).

The mounting bracket (10) is mounted in the body of an electronic device and has a top, a bottom, a mounting hole (11), two optional notches (12) and two limits (13). The mounting hole (11) is defined through the mounting bracket (10) and has a rim and a diameter. The notches (12) are formed in the rim of the mounting hole (11) diametrically opposite to each other, and each notch (12) has a top and a bottom. The limits (13) are formed on and protrude from the top of the mounting bracket (10) outside the mounting hole (11) at an angular separation slightly greater than 180°.

Figure 3:
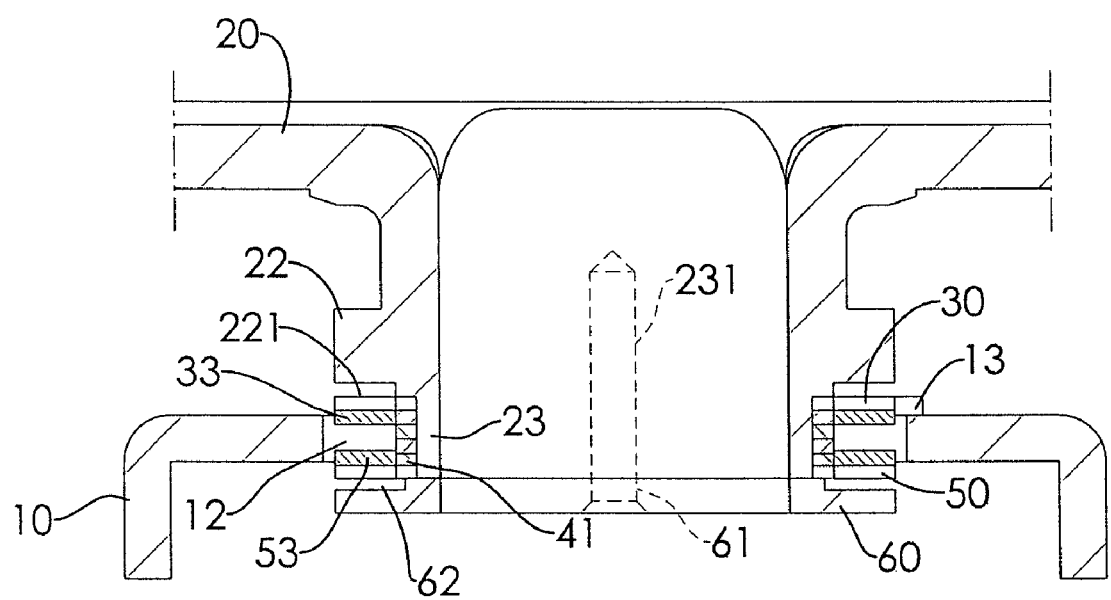
FIG. 3 is a side view in partial section of the hinge in FIG. 1.
Figure 4:
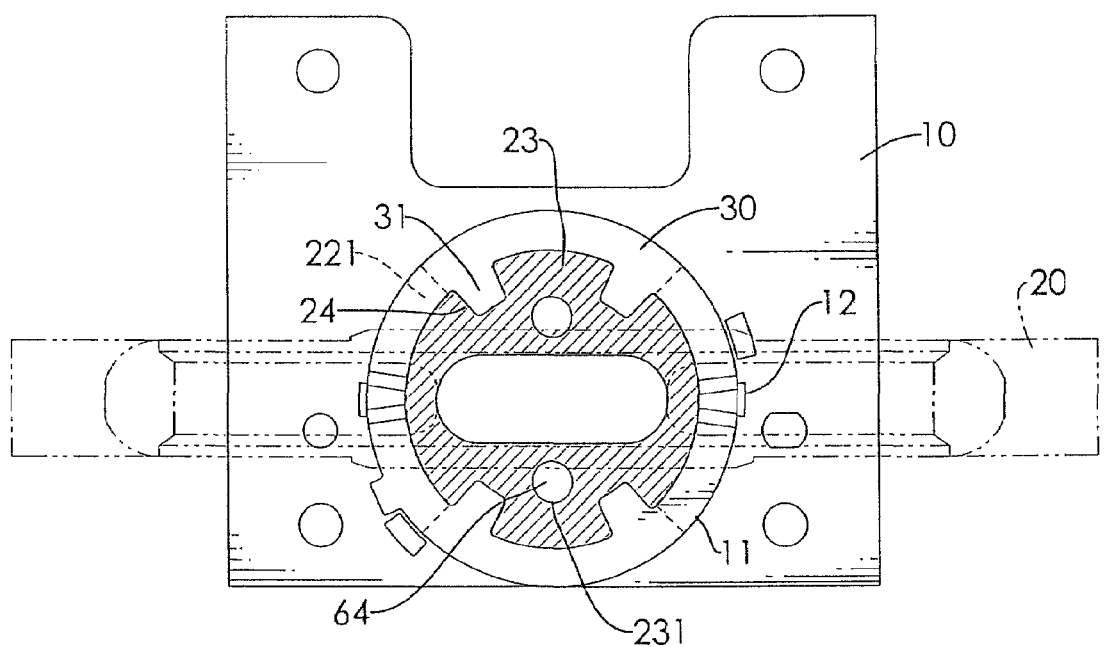
FIG. 4 is an operational top view in partial section of the hinge in FIG. 1.
Figure 5:
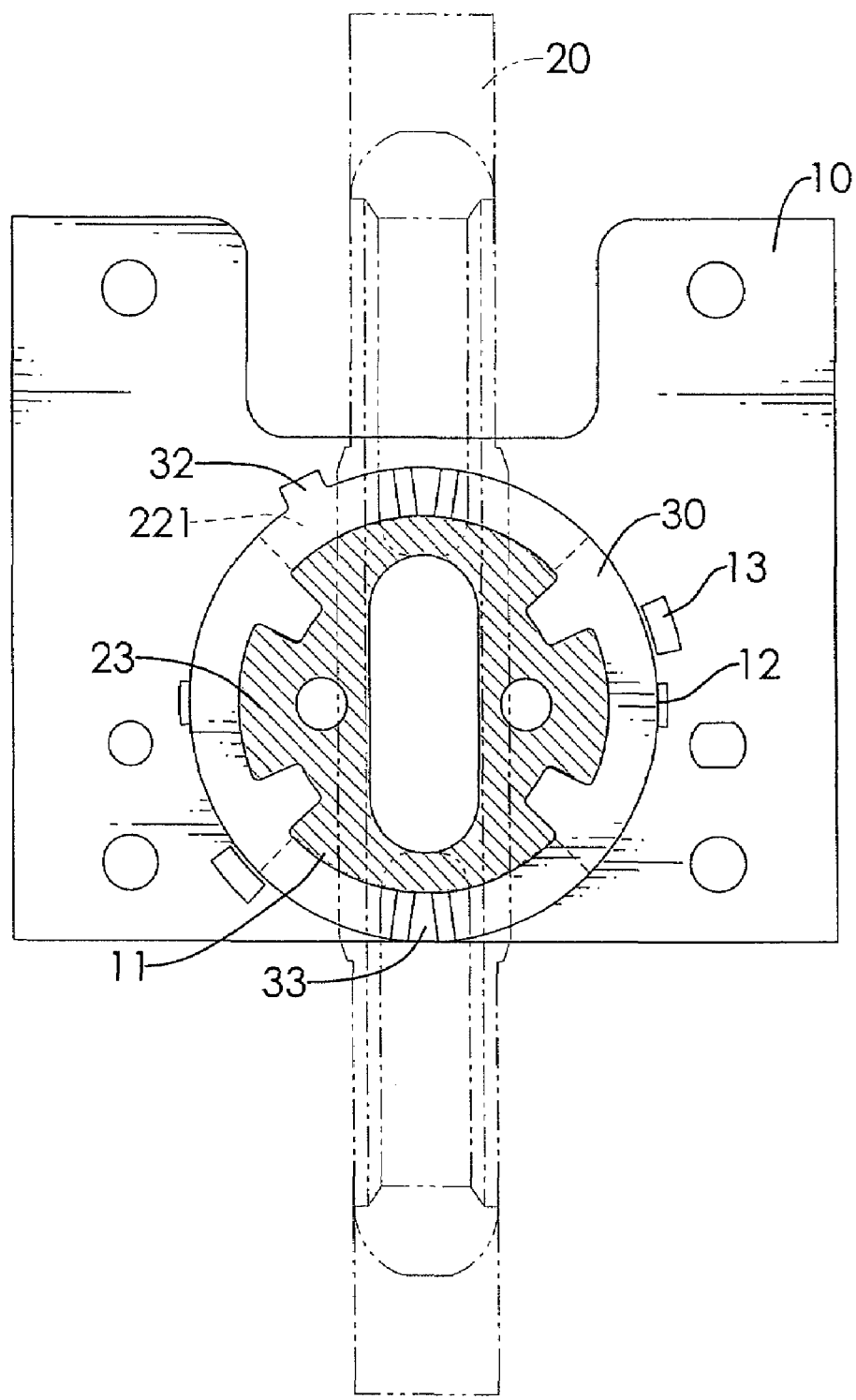
FIG. 5 is an operational top view in partial section of the hinge in FIG. 1 with the hinge rotated.

The hinge assembly (20) is made of malleable metal like zinc alloy, is mounted rotatably through the mounting bracket (10), may have two ends and has a top, a bottom, at least one pintle (21), at least one leaf (211) and a rotatable base (22). The at least one pintle (21) is formed transversely at the top of the hinge assembly (20) and may be implemented as two pintles (21) formed respectively on the two ends of the hinge assembly (20). The at least one leaf (211) is rotatably mounted on the at least one pintle (21), connects to a monitor and allows the monitor to be pivoted relative to the hinge assembly (20). When the hinge assembly has two leaves (211), the leaves (211) are rotatably mounted respectively on the pintles (21). The rotatable base (22) is formed on the bottom of the hinge assembly (20), is mounted rotatably in and extends up from the mounting bracket (10), allows a monitor connected to the hinge assembly (20) to be rotated relative to the base of the electronic device and has a diameter, a bottom and a mounting cylinder (23). The diameter of the rotatable base (22) is larger than the diameter of the mounting hole (1). With further reference to FIGS. 3, 4 and 5, the mounting cylinder (23) is formed coaxially on and protrudes down from the bottom of the rotatable base (22), is mounted rotatably in the mounting hole (11) in the mounting bracket (10) and has an outer diameter, a top end, a bottom end, an outer surface, multiple slots (24), an annular recess (221) and at least one optional threaded hole (231). The diameter of the mounting cylinder (23) is smaller than the diameter of the mounting hole (11) in the mounting bracket (10). The slots (24) are defined longitudinally at intervals radially in the outer surface of the mounting cylinder (23), and each slot (24) has a bottom end and a top end. The bottom end communicates with the bottom end of the mounting cylinder (23). The top end approaches but does not coincide with the top end of the mounting cylinder (23). The annular recess (221) is defined around the outer surface of the mounting cylinder (23) between the top end of the slots (24) and the bottom of the rotatable base (22). The at least one threaded hole (231) is defined in the bottom end of the mounting cylinder (23).

The limit and positioning element (30) is resilient, is mounted securely around the mounting cylinder (23) and slidably against the top of the mounting bracket (10) in the annular recess (221) and has an outer edge, a central hole, an inner edge, multiple tabs (31), multiple optional biasing elements (33) and a stop (32). The central hole is mounted around the mounting cylinder (23). The tabs (31) are formed on and protrude in from the inner edge and correspond respectively to and are mounted respectively in the slots (24) in the mounting cylinder (23) to make the limit and positioning element (30) rotate with the hinge assembly (20). The biasing elements (33) are formed on and protrude down from the limit and positioning element (30), correspond respectively to and are selectively held respectively in the notches (12) in the mounting bracket (10) to hold the hinge assembly (20) in position and slide on the top of the mounting bracket (10) when the hinge assembly (20) rotates relative to the mounting bracket (10). The stop (32) is formed on and protrudes radially out from the outer edge of the limit and positioning element (30) and rotates between and abuts one of the two limits (13) to keep the limit (13) and positioning element (30) and the hinge assembly (20) rotating between the limits (13).

The bushing assembly (40) is mounted securely around the mounting cylinder (23), against the limit and positioning element (30) and slidably against the rim of the mounting hole (11) in the mounting bracket (10), keeps the mounting cylinder (23) from rubbing against the mounting bracket (10) and comprises at least one plastic washer (41). Each plastic washer (41) has a smooth outer edge, an inner edge and multiple tabs (42). The smooth outer edge slidably abuts the rim of the mounting hole (11) through the mounting bracket (10). The tabs (42) are formed on and protrude in from the inner edge and correspond respectively to and are mounted respectively in the slots (24) in the mounting cylinder (23) to make the bushing assembly (40) rotate with the hinge assembly (20).

The supplementary positioning element (50) is resilient, is mounted securely around the mounting cylinder (23) and slidably against the bottom of the mounting bracket (10), has a central hole, an inner edge, multiple tabs (51) and two optional biasing elements (53) and may be the same as the limit and positioning element (30) except being mounted with the biasing elements (53) pressing against the bottom of the mounting bracket (10). The central hole is mounted around the mounting cylinder (23). The tabs (51) are formed on and protrude in from the inner edge and correspond respectively to and are mounted respectively in the slots (24) in the mounting cylinder (23) to make the supplementary positioning element (50) rotate with the hinge assembly (20). The biasing elements (53) are formed on and protrude up from the supplementary positioning element (50), correspond respectively to and are selectively held respectively in the notches (12) in the mounting bracket (10) and slide on the bottom of the mounting bracket (10) when the hinge assembly (20) rotates relative to the mounting bracket (10).

The end cap (60) is connected securely to the bottom end of the mounting cylinder (23) of the rotatable base (22), holds the hinge assembly (20) rotatably in the mounting hole (11) in the mounting bracket (10) and has a diameter, an inner surface, an outer edge, two optional curved recesses (62), at least one optional through hole (61) and at least one optional fastener (64). The diameter is larger than the diameter of the mounting hole (11). The curved recesses (62) are defined in the inner surface adjacent to the outer edge of the end cap (60) opposite to each other, correspond to the biasing elements (53) of the supplementary positioning element (50) and allow the supplementary positioning element (50) around the biasing elements (53) to deflect somewhat respectively into the curved recesses (62) when the biasing elements (53) slide on the bottom of the mounting bracket (10). The through holes (61) are defined through the end cap (60) and correspond respectively to and align with the at least one threaded hole (231) in the mounting cylinder (23). The at least one fastener (64) extends respectively through the at least one through hole (61) and screws respectively into the corresponding threaded holes (231) in the mounting cylinder (23) to hold the limit and positioning element (30), the bushing assembly (40), the supplementary positioning element (50) and the mounting bracket (10) securely on the mounting cylinder (23).

The hinge as described has the following advantages. Since the hinge assembly (20) is made of malleable metal, fabrication of the hinge is easy and timesaving. Furthermore, the bushing assembly (40) isolates the hinge assembly (20) from the mounting bracket (10) so the hinge assembly (20) do not appreciably wear and are not uneasily broken.

Even though numerous characteristics and advantages of the present invention have been set forth in the foregoing description together with details of the structure and function of the invention, the disclosure is illustrative only. Changes may be made in detail especially in matters of shape, size and arrangement of parts within the principles of the invention to the full extent indicated by the broad general meaning of the terms in which the appended claims are expressed.

What is claimed is:

1. A hinge comprising
a mounting bracket having
  a top;
  a bottom;
  a mounting hole being defined through the mounting bracket and having a rim and a diameter; and
  two limits being formed on and protruding from the top of the mounting bracket outside the mounting hole at an determined angular separation;
a hinge assembly being made of malleable metal, being mounted rotatably through the mounting bracket and having
  a top;
  a bottom;
  at least one pintle being formed transversely at the top of the hinge assembly;
  at least one leaf being rotatably mounted on the at least one pintle; and
  a rotatable base being formed on the bottom of the hinge assembly, being mounted rotatably in the mounting bracket and having
    a diameter being larger than the diameter of the mounting hole;
    a bottom; and
    a mounting cylinder being formed coaxially on and protruding down from the bottom of the rotatable base, being mounted rotatably in the mounting hole in the mounting bracket and having an outer diameter being smaller than the diameter of the mounting hole in the mounting bracket;
a top end;
a bottom end;
an outer surface;
multiple slots being defined radially at intervals in the outer surface of the mounting cylinder, and each slot having
a bottom end communicating with the bottom end of the mounting cylinder; and
a top end; and
an annular recess being defined around the outer surface of the mounting cylinder between the top ends of the slots and the bottom of the rotatable base;
a limit and positioning element being resilient and being mounted securely around the mounting cylinder and slidably against the top of the mounting bracket in the annular recess and having
an outer edge;
a central hole being mounted around the mounting cylinder;
an inner edge;
multiple tabs being formed on and protruding in from the inner edge of the limit and positioning element and corresponding respectively to and being mounted respectively in the slots in the mounting cylinder; and
a stop being formed on and protruding radially out from the outer edge of the limit and positioning element and rotating between and abutting the two limits;
a bushing assembly being mounted securely around the mounting cylinder, against the limit and positioning element and slidably against the rim of the mounting hole in the mounting bracket to keep the mounting cylinder from rubbing against the mounting bracket and comprising at least one plastic washer, each having
a smooth outer edge slidably abutting the rim of the mounting hole through the mounting bracket;
an inner edge; and
multiple tabs being formed on and protruding in from the inner edge and corresponding respectively to and being mounted respectively in the slots in the mounting cylinder;
a supplementary positioning element being resilient and being mounted securely around the mounting cylinder and slidably against the bottom of the mounting bracket and having
a central hole being mounted around the mounting cylinder;
an inner edge; and
multiple tabs being formed on and protruding in from the inner edge and corresponding respectively to and being mounted respectively in the slots of the mounting cylinder; and an end cap being connected securely to the bottom of the mounting cylinder of the rotatable base, holding the hinge assembly rotatably in the mounting hole in the mounting bracket and having
a diameter larger than the diameter of the mounting hole.

2. The hinge as claimed in claim 1, wherein
the mounting bracket further has two notches formed in the rim of the mounting hole diametrically opposite to each other, and each notch has a top and a bottom;
the limit and positioning element further has two biasing elements formed on and protruding down from the limit and positioning element, corresponding respectively to and selectively held respectively in the notches in the mounting bracket and sliding on the top of the mounting bracket when the hinge assembly rotates relative to the mounting bracket;
the supplementary positioning element further has two biasing elements formed on and protruding up from the supplementary positioning element, corresponding respectively to the notches in the mounting bracket and sliding on the bottom of the mounting bracket when the hinge assembly rotates relative to the mounting bracket; and
the end cap further has
an inner surface; and
an outer edge; and
two curved recesses defined in the inner surface adjacent to the outer edge of the end cap opposite to each other, corresponding to the biasing elements of the supplementary positioning element.

3. The hinge as claimed in claim 1, wherein the hinge assembly has two ends;
two pintles being formed respectively on the two ends of the hinge assembly; and
two mounting leaves being rotatably mounted respectively on the pintles.

4. The hinge as claimed in claim 1, wherein
the mounting cylinder further has at least one threaded hole defined in the bottom end of the mounting cylinder; and
the end cap further has
at least one through hole defined through the end cap and corresponding respectively to and aligning with the at least one threaded hole in the mounting cylinder; and
at least one fastener extending respectively through the at least one through hole and screwing respectively into the at least one threaded holes in the mounting cylinder.

5. The hinge as claimed in claim 1, wherein the hinge assembly is made of zinc alloy.

* * * * *